United States Patent
Satyaseelan

(10) Patent No.: US 10,844,911 B2
(45) Date of Patent: Nov. 24, 2020

(54) HYBRID MODULE COOLING

(71) Applicant: Schaeffler Tehnologies AG & Co. KG, Herzogenaurach (DE)

(72) Inventor: Ayyalraju Satyaseelan, Wooster, OH (US)

(73) Assignee: Schaeffler Tehnologies AG & Co. KG, Herzogenaurach (DE)

( * ) Notice: Subject to any disclaimer, the term of this patent is extended or adjusted under 35 U.S.C. 154(b) by 38 days.

(21) Appl. No.: 16/268,871

(22) Filed: Feb. 6, 2019

(65) Prior Publication Data
US 2020/0248758 A1 Aug. 6, 2020

(51) Int. Cl.
| | |
|---|---|
| F16D 25/12 | (2006.01) |
| F16D 25/10 | (2006.01) |
| H02K 7/00 | (2006.01) |
| H02K 9/19 | (2006.01) |
| B60K 6/387 | (2007.10) |
| F16H 45/00 | (2006.01) |

(52) U.S. Cl.
CPC .......... *F16D 25/123* (2013.01); *F16D 25/10* (2013.01); *B60K 6/387* (2013.01); *F16H 45/00* (2013.01); *H02K 7/006* (2013.01); *H02K 9/19* (2013.01)

(58) Field of Classification Search
CPC .... F16D 25/12; F16D 25/10; F16H 2045/002; F16H 45/02; B60K 6/387; B60K 6/36; B60L 2220/50; H02K 7/006; H02K 9/19; H02K 7/108
See application file for complete search history.

(56) References Cited

U.S. PATENT DOCUMENTS

| | | | | |
|---|---|---|---|---|
| 2006/0144665 A1* | 7/2006 | Janson | ..................... | B60K 6/48 192/48.8 |
| 2013/0111891 A1* | 5/2013 | Iwase | ..................... | F02B 63/042 60/347 |
| 2014/0144742 A1* | 5/2014 | Sperrfechter | .......... | B60K 6/405 192/3.29 |
| 2014/0256506 A1* | 9/2014 | Ideshio | ................... | F16H 41/24 477/5 |
| 2016/0109010 A1* | 4/2016 | Lindemann | ............. | F16H 41/28 192/3.21 |

FOREIGN PATENT DOCUMENTS

KR 10-2018-0068736 * 6/2018

OTHER PUBLICATIONS

Payne et al., U.S. Appl. No. 16/029,992, filed Jul. 9, 2018.
Simon et al., U.S. Appl. No. 15/971,092, filed May 4, 2018.

* cited by examiner

*Primary Examiner* — Mark A Manley
(74) *Attorney, Agent, or Firm* — Kevin L. Parks

(57) ABSTRACT

A rotor carrier for a hybrid module includes an annular ring, a first tubular segment, a second tubular segment, and a first radially extending orifice. The annular ring is arranged for fixing to a torque converter cover. The annular ring includes radially inner portion. The first tubular segment extends from the radially inner portion in a first axial direction. The second tubular segment extends from the first tubular segment in the first axial direction. The first radially extending orifice is disposed in the second tubular segment. The annular ring, the first tubular segment, and the second tubular segment are integrally formed from a same piece of material. The first tubular segment has a first outer diameter, and the second tubular segment has an outer surface with a second outer diameter, less than the first outer diameter.

17 Claims, 3 Drawing Sheets

HYBRID MODULE COOLING

TECHNICAL FIELD

The present disclosure relates generally to a hybrid module, and more specifically to a cooling arrangement for a hybrid module.

BACKGROUND

Hybrid modules and rotor carriers are known from commonly-assigned U.S. patent application Ser. No. 16/029,992 titled OIL DISTRIBUTION IN A HYBRID MODULE and commonly-assigned U.S. patent application Ser. No. 15/971,092 titled HYBRID MODULE INCLUDING STAMPED ROTOR CARRIER Both of these applications are hereby incorporated by reference as if set forth fully herein.

SUMMARY

Example aspects broadly comprise a rotor carrier for a hybrid module with an annular ring, a first tubular segment, a second tubular segment, and a first radially extending orifice. The annular ring is arranged for fixing to a torque converter cover. The annular ring includes radially inner portion. The first tubular segment extends from the radially inner portion in a first axial direction. The second tubular segment extends from the first tubular segment in the first axial direction. The first radially extending orifice is disposed in the second tubular segment. The annular ring, the first tubular segment, and the second tubular segment are integrally formed from a same piece of material. The first tubular segment has a first outer diameter, and the second tubular segment has an outer surface with a second outer diameter, less than the first outer diameter. In some example embodiments, the rotor carrier has a third tubular segment extending from the second tubular segment in the first axial direction. The third tubular segment is integrally formed from the same piece of material as the annular ring, the first tubular segment, and the second tubular segment. In an example embodiment, the third tubular segment has a third outer diameter, equal to the first outer diameter.

In an example embodiment, the second tubular segment has an inner spline for driving engagement with a plurality of clutch plates. In an example embodiment, the rotor carrier has a second radially extending orifice disposed in the second tubular segment and axially offset from the first radially extending orifice. In an example embodiment, the rotor carrier has a first machined, axially extending groove with a single, continuous surface extending through the first tubular segment and the second tubular segment.

In some example embodiments, the rotor carrier has a first machined, axially extending groove with a single, continuous surface extending through the first tubular segment, the second tubular segment, and the third tubular segment. In an example embodiment, the rotor carrier has a second machined, axially extending groove and a third machined, axially extending groove. The second machined, axially extending groove extends through the first tubular segment and has a first surface. The third machined, axially extending groove extends through the third tubular segment and has a second surface. The first surface and the second surface are aligned. The first surface and the second surface are disposed at a diameter greater than the second outer diameter.

In an example embodiment, a rotor for a hybrid module includes the rotor carrier, a torque converter cover, and a plurality of rivets. The annular ring has a first plurality of circumferentially distributed holes. The torque converter cover has a second plurality of circumferentially distributed holes, axially aligned with the first plurality of circumferentially distributed holes. The rivets are disposed in the first plurality of circumferentially distributed holes and the second plurality of circumferentially distributed holes to fix the torque converter cover to the rotor carrier.

In some example embodiments, a rotor for a hybrid module includes the rotor carrier, a plurality of rotor segments, a first spacer plate, an end ring, and a second spacer plate. The first spacer plate is installed between the annular ring and a first one of the plurality of rotor segments. The end ring is fixed to the third tubular segment. The second spacer plate is installed between the end ring and a second one of the plurality of rotor segments. In an example embodiment, the rotor carrier has a first axially extending groove with a single, continuous surface extending through the first tubular segment, the second tubular segment, and the third tubular segment. Each of the plurality of rotor segments has a radially inwardly extending tab installed in the first axially extending groove. In an example embodiment, at least one of the first spacer plate or the second spacer plate has a radial groove.

In some example embodiments, the rotor carrier has a second axially extending groove and a third axially extending groove. The second axially extending groove extends through the first tubular segment and has a first surface. The third axially extending groove extends through the third tubular segment and has a second surface. The first surface and the second surface are aligned. In an example embodiment, the rotor has an axial channel. Each of the plurality of rotor segments has a radially inner surface. The axial channel is at least partially bounded by the radially inner surfaces, the outer surface, the first surface, and the second surface.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
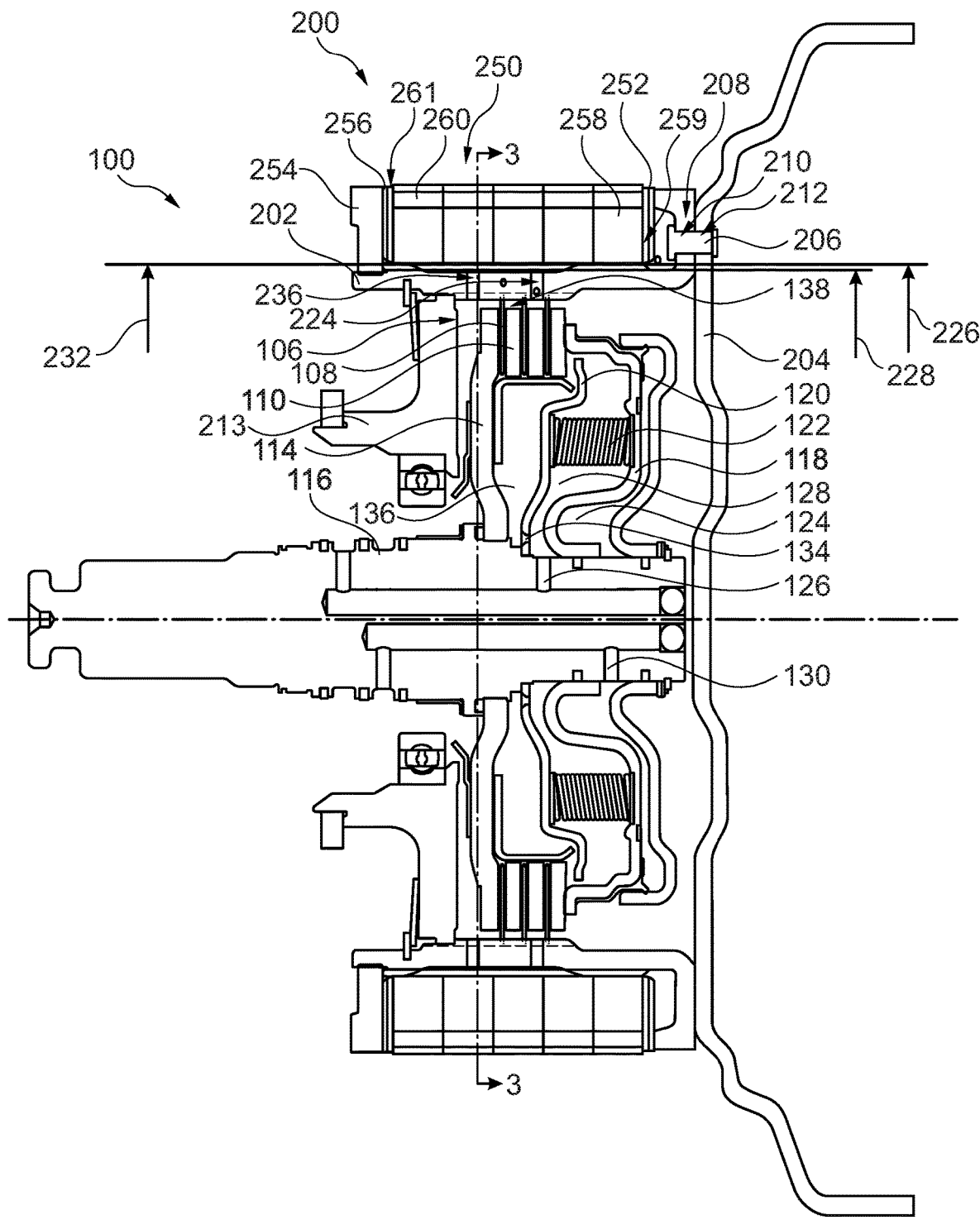
FIG. 1 illustrates a cross-sectional view of a portion of a hybrid module.

The following description is made with reference to FIG. 1. FIG. 1 illustrates a cross-sectional view of a portion of hybrid module 100. Hybrid module 100 includes rotor 200 with rotor carrier 202, torque converter cover 204, and rivets 206. Rotor carrier 202 includes annular ring 208 with circumferentially distributed holes 210 (see also FIG. 2). Torque converter cover 204 includes circumferentially distributed holes 212, axially aligned with holes 210. Rivets 206 are disposed in holes 210 and 212 to fix the torque converter cover to the rotor carrier.

Hybrid module 100 also includes clutch assembly 106 with clutch plates 108 splined to rotor 200, separator plates 110 splined to clutch carrier 112, backing plate 114 fixed to shaft 116, and piston 118 for engaging the clutch plates with the separator plates. Clutch carrier 112 is fixed to backing plate 114. Balance dam 120 allows smooth engagement of piston 118 and spring 122 releases piston 118 when pressure in engagement chamber 124 is reduced.

Shaft 116 includes channel 126 for providing a balance flow to balance chamber 128 and channel 130 for providing flow to engagement chamber 124. Balance dam 120 includes orifice 134 for flowing oil from balance chamber 128 to cooling chamber 136. Radial holes (not shown) in clutch carrier 112 allow flow from the cooling chamber through grooves (not shown) in clutch plates 108 to chamber 138, radially inside of rotor 200. Chamber 138 is at least partially bounded by rotor 200, torque converter cover 204, and rotor flange 213.

Figure 2:
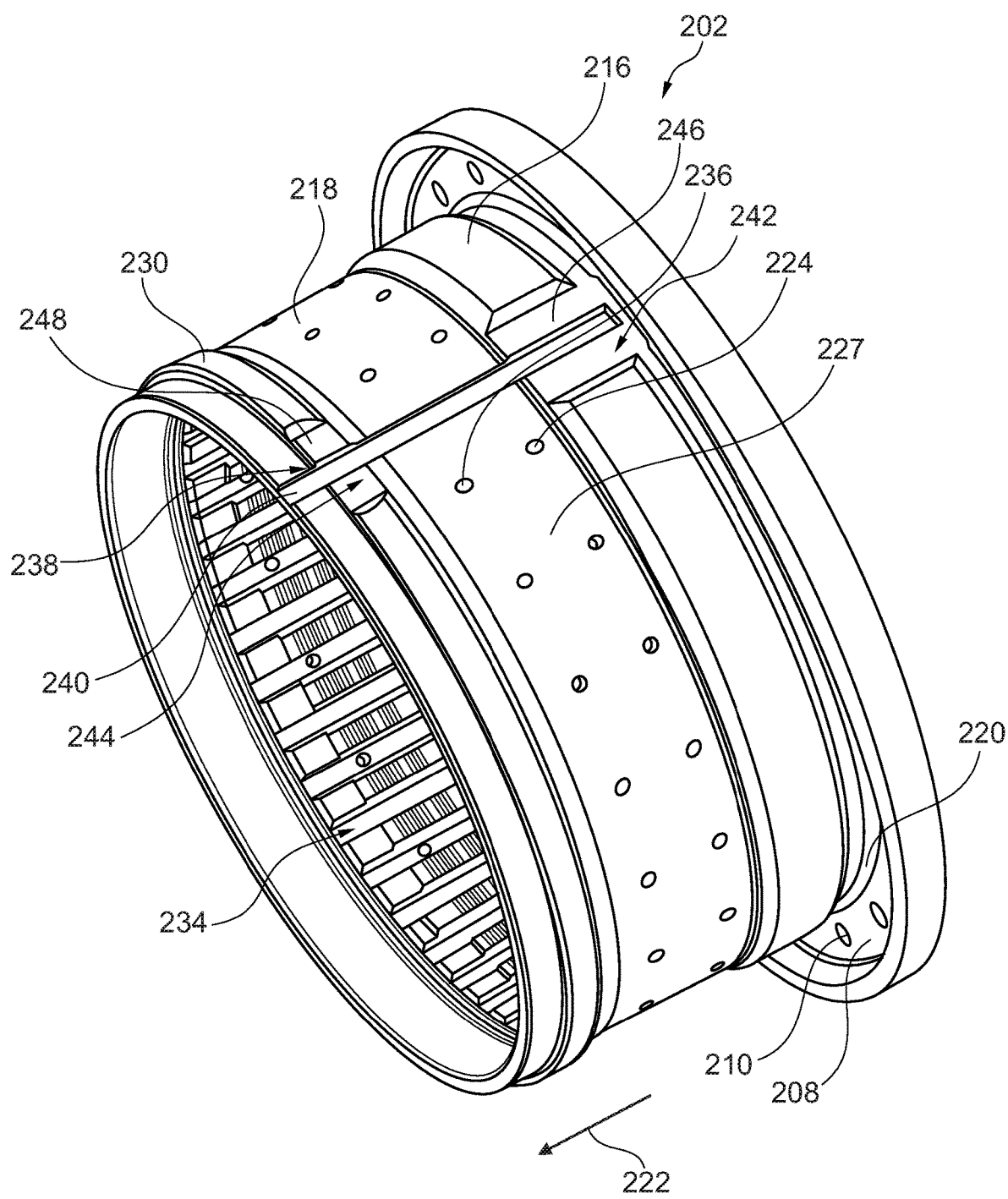
FIG. 2 illustrates a perspective view of a rotor carrier according to an example embodiment.

The following description is made with reference to FIGS. 1-2. FIG. 2 illustrates a perspective view of rotor carrier 202. Rotor carrier 202 includes annular ring 208, tubular segment 216, and tubular segment 218. Ring 208 is arranged for fixing to a torque converter cover as described above. Ring 208 includes radially inner portion 220. Tubular segment 216 extends from portion 220 in axial direction 222. Tubular segment 218 extends from segment 216 in axial direction 222. Radially extending orifice 224 is disposed in segment 218. Ring 214, segment 216, and segment 218 are integrally formed from a same piece of material. Segment 216 includes outer diameter 226 and segment 218 includes outer surface 227 with outer diameter 228, less than outer diameter 226.

Rotor carrier 202 includes tubular segment 230 extending from segment 218 in axial direction 222. Segment 230 is integrally formed from the same piece of material as annular ring 208, segment 216, and segment 218. Segment 230 includes outer diameter 232, equal to outer diameter 226. Segment 218 includes inner spline 234 for driving engagement with clutch plates 108 (ref. FIG. 1). Rotor carrier 202 includes radially extending orifice 236 disposed in the tubular segment 218 and axially offset from orifice 224.

Rotor carrier 202 includes machined, axially extending groove 238 with a single, continuous surface 240 extending through tubular segments 216, 218, and 230. Rotor carrier 202 includes machined, axially extending groove 242 extending through tubular segment 216 and machined, axially extending groove 244 extending through tubular segment 230. Groove 242 includes surface 246 and groove 244 includes surface 248, aligned with surface 246. Surfaces 246 and 248 are disposed at a diameter greater than outer diameter 228.

Figure 3:
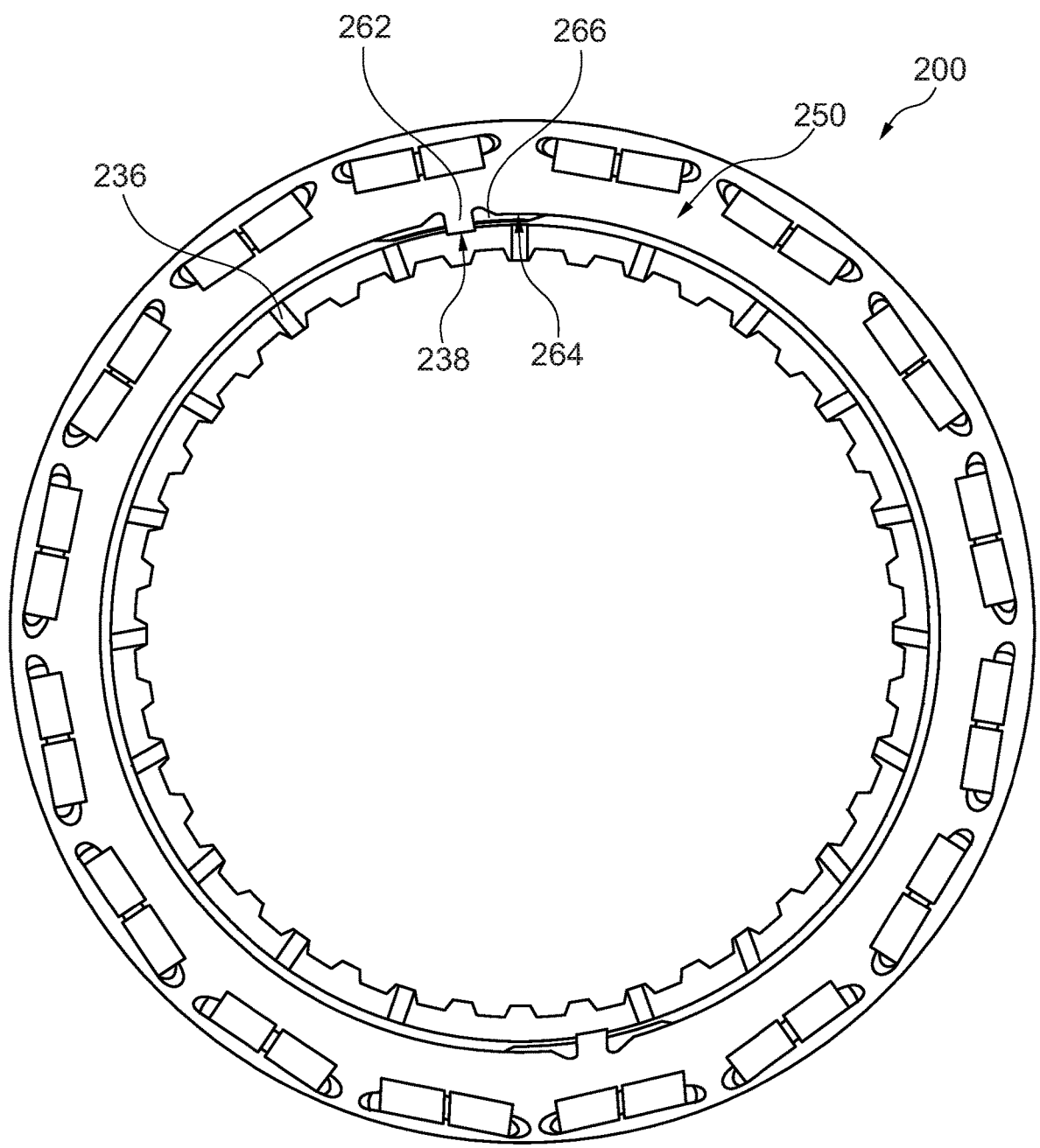
FIG. 3 illustrates a cross-sectional view of a rotor taken generally along line 3-3 in FIG. 1.

The following description is made with reference to FIGS. 1-3. FIG. 3 illustrates a cross-sectional view of rotor 200 taken generally along line 3-3 in FIG. 1. Rotor 200 includes rotor segments 250, spacer plate 252, end ring 254, and spacer plate 256. Spacer plate 252 is installed between the annular ring and rotor segment 258 and includes radial groove 259. End ring 254 is fixed to tubular segment 230 by a shrink fit and/or staking, for example. Spacer plate 256 is installed between the end ring and rotor segment 260, and includes radial groove 261. Rotor segments 250 have radially inwardly extending tabs 262 installed in axially extending groove 238 and radially inner surfaces 264. Rotor 200 includes axial channel 266 at least partially bounded by surfaces 264, outer surface 227, surface 246 and surface 248.

Returning to FIG. 1, the flow path of the cooling flow will now be described. Flow enters through channel 126 and fills chamber 128. Once chamber 128 is filled, flow continues through orifice 134 to cooling chamber 136, through holes (not shown) in carrier 112 and grooves (not shown) in clutch plates 108, to chamber 138. Flow from chamber 138 enters axial channel 266 through holes 224 and 236 in carrier 202. Channel 236 extends from spacer plate 252 to spacer plate 256 where flow exits through grooves 259 and 261, and sprays onto stator coils (not shown). Advantageously, the disclosed flow path can be used for a rotor carrier manufactured using a cheaper stamping process instead of a more expensive casting or forging process.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
106 Clutch assembly
108 Clutch plates
110 Separator plates
112 Clutch carrier
114 Backing plate 116 Shaft
118 Piston
120 Balance dam
122 Spring
124 Chamber (engagement)
126 Channel (balance)
128 Chamber (balance)
130 Channel (engagement)
134 Orifice (balance dam)
136 Chamber (cooling)
138 Chamber (inside rotor)
200 Rotor
202 Rotor carrier
204 Torque converter cover
206 Rivets
208 Annular ring
210 Holes (rotor carrier)
212 Holes (cover)
213 Rotor flange
216 Tubular segment (first)
218 Tubular segment (second)
220 Radially inner portion (ring)
222 Axial direction
224 Radially extending orifice (first)
226 Outer diameter (first segment)
227 Outer surface (second segment)
228 Outer diameter (second segment)
230 Tubular segment (third)
232 Outer diameter (third segment)
234 Inner spline
236 Radially extending orifice (second)
238 Axially extending groove (first)
240 Single, continuous surface (first groove)
242 Axially extending groove (second)
244 Axially extending groove (third)
246 Surface (second groove)
248 Surface (third groove)
250 Rotor segments
252 Spacer plate (first)
254 End ring
256 Spacer plate (second)
258 Rotor segment (first)
259 Radial groove (spacer plate 252)
260 Rotor segment (second)
261 Radial groove (spacer plate 256)
262 Radially inwardly extending tabs
264 Radially inner surfaces (rotor segments)
266 Axial channel

What is claimed is:

1. A rotor carrier for a hybrid module, comprising:
an annular ring arranged for fixing to a torque converter cover and comprising a radially inner portion;
a first tubular segment extending from the radially inner portion in a first axial direction;
a second tubular segment extending from the first tubular segment in the first axial direction;
a first radially extending orifice disposed in the second tubular segment; and,
a first machined, axially extending groove with a single, continuous surface extending through the first tubular segment and the second tubular segment, wherein:
the annular ring, the first tubular segment, and the second tubular segment are integrally formed from a same piece of material; and,
the first tubular segment comprises a first outer diameter, and the second tubular segment comprises an outer surface with a second outer diameter, less than the first outer diameter.

2. The rotor carrier of claim 1 further comprising:
a third tubular segment extending from the second tubular segment in the first axial direction, wherein the third tubular segment is integrally formed from the same piece of material as the annular ring, the first tubular segment, and the second tubular segment.

3. The rotor carrier of claim 2 wherein the third tubular segment comprises a third outer diameter, equal to the first outer diameter.

4. The rotor carrier of claim 1 wherein the second tubular segment comprises an inner spline for driving engagement with a plurality of clutch plates.

5. The rotor carrier of claim 1 further comprising a second radially extending orifice disposed in the second tubular segment and axially offset from the first radially extending orifice.

6. The rotor carrier of claim 2 further comprising:
a second machined, axially extending groove extending through the first tubular segment and comprising a first surface; and,
a third machined, axially extending groove extending through the third tubular segment and comprising a second surface, wherein:
the first surface and the second surface are aligned; and,
the first surface and the second surface are disposed at a diameter greater than the second outer diameter.

7. A rotor for a hybrid module comprising:
the rotor carrier of claim 1;
a torque converter cover; and,
a plurality of rivets, wherein:
the annular ring comprises a first plurality of circumferentially distributed holes;
the torque converter cover comprises a second plurality of circumferentially distributed holes, axially aligned with the first plurality of circumferentially distributed holes; and,
the rivets are disposed in the first plurality of circumferentially distributed holes and the second plurality of circumferentially distributed holes to fix the torque converter cover to the rotor carrier.

8. A rotor for a hybrid module comprising:
the rotor carrier of claim 2;
a plurality of rotor segments;
a first spacer plate installed between the annular ring and a first one of the plurality of rotor segments;
an end ring fixed to the third tubular segment; and,
a second spacer plate installed between the end ring and a second one of the plurality of rotor segments.

9. The rotor of claim 8 wherein:
the rotor carrier comprises a first axially extending groove with a single, continuous surface extending through the first tubular segment, the second tubular segment, and the third tubular segment; and,
each of the plurality of rotor segments comprises a radially inwardly extending tab installed in the first axially extending groove.

10. The rotor of claim 8 wherein at least one of the first spacer plate or the second spacer plate comprises a radial groove.

11. The rotor of claim 8 wherein:
the rotor carrier comprises:

a second axially extending groove extending through the first tubular segment comprising a first surface; and, a third axially extending groove extending through the third tubular segment and comprising a second surface; and, the first surface and the second surface are aligned.

12. The rotor of claim 11 further comprising an axial channel, wherein:

each of the plurality of rotor segments comprises a radially inner surface; and, the axial channel is at least partially bounded by:
the radially inner surfaces;
the outer surface;
the first surface; and,
the second surface.

13. A rotor for a hybrid module comprising:

a rotor carrier, comprising:
an annular ring arranged for fixing to a torque converter cover and comprising a radially inner portion;
a first tubular segment extending from the radially inner portion in a first axial direction;
a second tubular segment extending from the first tubular segment in the first axial direction;
a third tubular segment extending from the second tubular segment in the first axial direction; and,
a first radially extending orifice disposed in the second tubular segment;

a plurality of rotor segments;

a first spacer plate installed between the annular ring and a first one of the plurality of rotor segments;

an end ring fixed to the third tubular segment; and, a second spacer plate installed between the end ring and a second one of the plurality of rotor segments, wherein:

the annular ring, the first tubular segment, the second tubular segment, and the third tubular segment are integrally formed from a same piece of material; and, the first tubular segment comprises a first outer diameter, and the second tubular segment comprises an outer surface with a second outer diameter, less than the first outer diameter.

14. The rotor of claim 13 wherein:

the rotor carrier comprises a first axially extending groove with a single, continuous surface extending through the first tubular segment, the second tubular segment, and the third tubular segment; and, each of the plurality of rotor segments comprises a radially inwardly extending tab installed in the first axially extending groove.

15. The rotor of claim 13 wherein at least one of the first spacer plate or the second spacer plate comprises a radial groove.

16. The rotor of claim 13 wherein:

the rotor carrier comprises:
a second axially extending groove extending through the first tubular segment comprising a first surface; and,
a third axially extending groove extending through the third tubular segment and comprising a second surface; and, the first surface and the second surface are aligned.

17. The rotor of claim 16 further comprising an axial channel, wherein:

each of the plurality of rotor segments comprises a radially inner surface; and, the axial channel is at least partially bounded by:
the radially inner surfaces;
the outer surface;
the first surface; and,
the second surface.

\* \* \* \* \*